Nov. 3, 1953  B. FRAZIER  2,657,594
PORTABLE SAW-FILING CLAMP
Filed Sept. 9, 1952
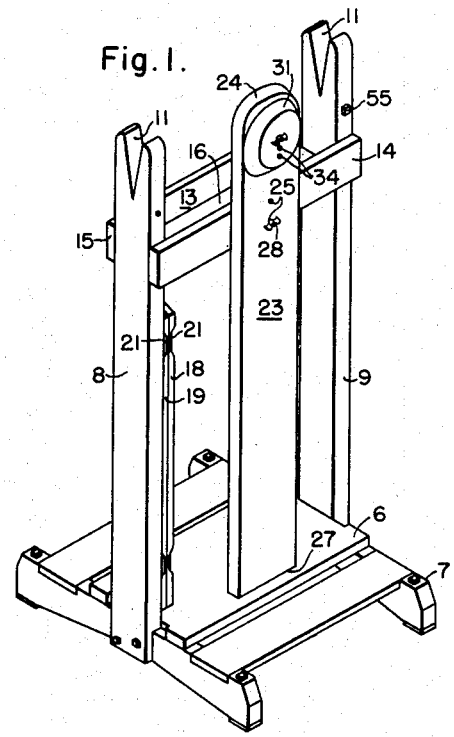
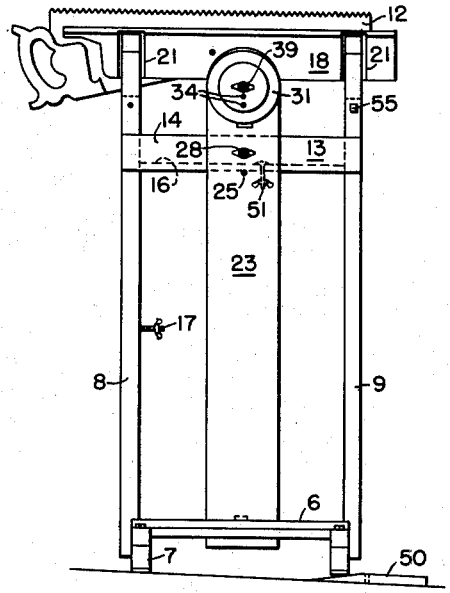
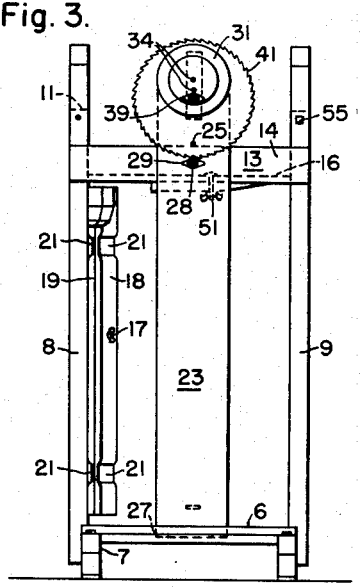
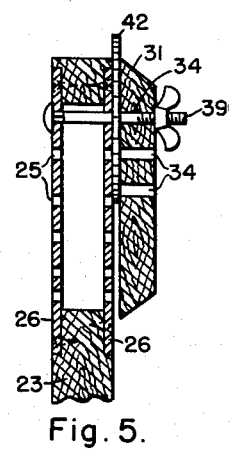
*INVENTOR.*
Bert Frazier.
BY O. B. Buchanan

Patented Nov. 3, 1953

2,657,594

UNITED STATES PATENT OFFICE 2,657,594

PORTABLE SAW-FILING CLAMP

Bert Frazier, Pittsburgh, Pa.

Application September 9, 1952, Serial No. 308,608

10 Claims. (Cl. 76—78)

My present invention relates to a portable stand or clamp, for greatly facilitating the task of sharpening all types of saws that need to be sharpened by filing.

Heretofore, the exacting job of saw-sharpening has been done with any one of several forms of available clamps, usually made of metal, usually shorter than the length of an ordinary handsaw, and always requiring to be fastened, in a fixed position, against the side of a workbench, or wherever else a suitable rigid support could be found, having the best available relation to a good source of light. After one side of the saw had been sharpened, in one of these old clamps, the saw had to be removed and reversed, in order to sharpen the other side, because it was impossible to get around on the other side of the clamp, and the light would be no good, on the other side, even if one could get there (assuming that the light was good on the first side). During the sharpening of either side of a handsaw, in one of these old clamps, the saw had to be removed or loosened several times, so that it could be slid along in the clamp, because the usual clamp was not long enough to sharpen the entire length of an ordinary handsaw in one clamping.

To successfully sharpen a saw, the saw must be firmly clamped at the proper height with respect to the workman's elbow and forearm, so that the file can be held at the proper angle and at the proper twist. Suitable lighting is of the utmost importance, because it is very important to be able to see the teeth very clearly. Natural lighting (daylight) is much better than electric lighting, even to the point of waiting for a bright, clear day before attempting to sharpen the saw, because electric lighting reflects on the saw. The light should come from the rear, over the workman's left shoulder (if he is righthanded). If the light is not right when a saw is being sharpened, the most skillful workman will get entirely too much hook, or not enough hook, or the wrong bevel, or uneven heights of teeth.

My present invention relates to a portable saw-filing clamp or stand, which can be moved around, so that it can be set up in a place where good daylight comes over the workman's left shoulder; and when one side of the saw has been sharpened, the saw may be left in the clamp, and the clamp can be turned around, so that the workman can remain where he was, with the light behind him, while sharpening the other side. The clamp is preferably made of wood, rather than metal, so that it will be light enough to be portable, and so that it can at the same time be made wide enough to hold practically the entire length of a handsaw, so that the entire saw can be sharpened in one clamping.

My portable saw-filing clamp is equipped to properly hold all types of saws which need filing. It has removable clamps for holding a handsaw, and it has a vertically adjustable circular-saw vise or clamp, which is adjustable to accommodate different sizes of circular saws, and which can be lowered out of the way when a handsaw is being sharpened.

With the foregoing and other objects in view, as will be subsequently explained, my invention consists in the structures, apparatus, combinations, parts, and methods of design, adjustment and operation, hereinafter described, and illustrated in the accompanying drawing, wherein, Figure 1 is an isometric perspective view of a portable saw-filing stand embodying my invention in an illustrative form, and showing the same with its parts disposed in the positions which they occupy when the stand is to be carried from one location to another, Fig. 2 is a front elevational view of the stand, showing its use while sharpening a handsaw, Fig. 3 is a similar view, showing the use of the stand for sharpening a large circular saw, Fig. 4 is a fragmentary front elevational view of the top of the circular-saw clamp, showing its adjustment for accommodating a small-diameter saw, and Fig. 5 is a larger-scale vertical sectional view of the top of the circular-saw clamp, on the section-plane V—V in Fig. 4.

My portable saw-filing stand comprises a flat horizontal base-piece in the form of a wooden board 6, having a four-footed wooden support 7. The stand also has two upright lateral stanchions 8 and 9, preferably also of wood, which are carried by the horizontal base-piece 6 and its four-footed support. The top of each of the stanchions has a crosswise-extending V-shaped notch 11 in it, and it is at a height suitable for sharpening a handsaw such as is indicated at 12 in Fig. 2. A convenience-till or trough 13 is secured between the two stanchions 8 and 9, in a position below the notches 11. This till comprises wooden front and back side-pieces 14 and 15, and a wooden bottom piece 16. It is not only convenient as a receptacle for the workman's file and other tools (not shown) but it also serves as a necessary rigid brace for the stanchions 8 and 9.

The left-hand stanchion 8 is provided, about halfway up, with a bolt 17, which serves as a means for removably carrying a pair of separate flat removable front and back handsaw-holding clamping-pieces 18 and 19, so that these handsaw clamping-pieces may be carried with the stand when it is being transported from one location to another, and so that there will be a place for these clamping-pieces, so that they will not be mislaid when they are not in use. As shown in Fig. 3, these two handsaw clamping-pieces 18 and 9 are wooden boards having a wedge-shaped thickness. The front face of the front clamping-piece 18, and the rear face of the rear clamping-piece 19, are provided with vertical grooves 21 for fitting in the V-shaped notches 11. Thus, when a handsaw, such as 12, is to be sharpened, as shown in Fig. 2, it is placed between the two clamping-pieces 18 and 19, which are then tightly pounded down into the V-shaped notches, to tightly clamp the handsaw in position for filing.

My portable stand is also provided with a flat vertically adjustable vertical or upstanding centrally disposed wooden board or piece 23, which serves as the supporting-part of a clamp for circular saws. This central vertical piece 23 has a rounded top end 24. Said vertical piece 23 is also provided with one or more vertical-adjustment front-and-back-extending holes 25, which may be either round or elongated. In the illustrated example, there are a plurality of discrete, vertically spaced, substantially round holes 25. Some or all of these holes 25 may be carried by metal plates 26, set into said vertical piece 23. The lower end of the vertical piece 23 is disposed in a vertically extending hole 27 in the flat horizontal base-piece 6, this hole being of a size and shape adapted to guide the vertical piece 23 in its vertical adjustment.

The till 13, and specifically its front side-piece 14, is provided with a forwardly extending bolt 28 in a position adapted to extend through either one of the two lowermost holes 25 in the vertically adjustable piece 23. This bolt 28 has a wingnut 29 for holding said vertically adjustable piece 23 tightly against the front side-piece 14 of the till 13, at either a height suitable for sharpening a circular saw, or a lower height which brings the top 24 of the vertically adjustable piece 23 out of the way, when a handsaw is being sharpened. The lowered position of the central upright piece 23 is shown in Figs. 1 and 2. The raised or operative position of said central upright piece 23 is illustrated in Fig. 3. The lower portion of said central upright piece 23 may be provided with a stop or shoulder, indicated by dotted lines 31 in Figs. 2 and 3. This stop 31 rests on the horizontal base-piece 6 when the vertical piece 23 is in its lowered, out-of-the-way position.

The top of the central, upright, vertically adjustable piece 23 cooperates with a separate circular-saw clamp-piece 31, which is shown in the form of a circular disk, although it could have other shapes, provided that at least its top end 32 is rounded, and preferably also both its top and bottom ends are rounded. This circular-saw clamp-piece 31 is provided with one or more radial-adjustment front-and-back-extending holes 34, which may be either round or elongated. In the illustrated example, there is a central, substantially round hole 34, and a plurality of other discrete, aligned, vertically spaced, substantially round holes 34 on one side of the central hole; or any other disposition of holes 34 might be provided at different radii with respect to the center of the disk.

The circular-saw clamp-piece 31 is held in place by a circular-saw clamping-bolt 39 which is adapted to extend through any one of the upper group of vertically spaced holes 25 in the central upright piece 23, and then through the central hole of a circular saw, which may be either a large-diameter saw 41, as shown in Fig. 3, or a small-diameter saw 42, as shown in Figs. 4 and 5, or any other size of circular saw. Finally, the circular-saw clamping-bolt 39 extends through any one of the holes 34 in the circular-saw clamp-piece 31. It will be apparent that the proper holes may be selected, according to the size of the circular saw which is to be sharpened.

In the use or operation of my portable saw-sharpening stand or clamp, an important characteristic is its portability, which not only enables it to be carried to the place where a saw is being used, but more importantly still, the saw-sharpening stand may be placed where the best daylight is to be found, and where the light will come over the workman's left shoulder, so that he can see the saw-teeth very clearly. Furthermore, when one side of the saw has been sharpened, it is not necessary to remove the saw from its clamp and turn it front-to-back in order to sharpen its other side, with the light still coming over the workman's left shoulder. On the contrary, the portability of my saw-sharpening stand or clamp makes it possible to pick up the stand, while the saw is still clamped in place, and the entire stand can be turned around in a moment's time, when the second side of the saw is to be sharpened.

When the stand is being used, it must rest firmly on the floor, so that it will not twist or wobble. This requirement rules out a three-footed stand or tripod, because such a stand would twist. However, a four-footed stand practically never rests firmly on the floor, because one foot will almost always be out of contact. To this end, some sort of foot-leveling means is usually needed, and a wedge-piece is the simplest kind of foot-leveling means, which can easily be placed under the high foot. According to my invention, I carry my own wedge-piece around with the stand, so that it can be inserted under the high foot, as shown at 50 in Fig. 2. Also, in order to prevent the loss of this wedge-piece 50 when it is not in use, or while the stand is being transported, I provide a means for removably carrying said wedge-piece somewhere on the stand, for example underneath the till 13. Thus, as shown in Figs. 2 and 3, the bottom piece 16 of the till 13 has a depending bolt 51, by which the wedge-piece 50 may be temporarily held, as shown in Fig. 3.

When a handsaw 12 is being sharpened, as shown in Fig. 2, the central vertically adjustable piece 23 being lowered to its lowermost position to keep out of the way, the stand is put in the place where the best light is available, it is wedged so as to stand firmly as shown in Fig. 2, and the handsaw 12 is clamped in place. Then, holding the base 7 with one foot, the workman proceeds to sharpen the saw.

If a circular saw is to be sharpened, the handsaw clamping-pieces 18 and 19 are placed on their temporary holding-bolt 17 as shown in Figs. 1 and 3, the central vertically adjustable piece 23 is raised to its uppermost adjusted position as shown in Fig. 3, the circular saw 41 or 42 is inserted in place, and the workman is ready to sharpen the saw.

My portable stand may be made of any suitable material or materials, but its requirement of portability makes it desirable that the larger parts of the stand shall be made of wood, for lightness. When a light material such as wood is used, it becomes practicable to make the stand wide enough to sharpen the entire length of an ordinary handsaw at a single clamping, without causing the stand to be too heavy for portability. In other words, the lateral separation between the two stanchions 8 and 9, and also the lengths of the two handsaw clamping-pieces 18 and 19, are nearly as long as an ordinary handsaw. If the stanchions 8 and 9 are made of wood, they should be provided, immediately below the V-shaped notches 11, with front-and-back-extending bolts 55 or other strengthening-means, for preventing splitting of the wood when the handsaw clamping-pieces 18 and 19 are pounded into place in the V-shaped notches.

While I have described and illustrated my invention in a single illustrative form of embodiment, I wish it to be understood that various changes in style, size and material may be made, and various substitutions of equivalents, as well as additions or omissions of parts, without departing from the essential principles of my invention, at least in its broadest aspects. I desire therefore, that the appended claims shall be accorded the broadest construction consistent with their language.

I claim as my invention:

1. A portable saw-filing stand, comprising a flat horizontal base-piece, a four-footed support for said base-piece, two upright lateral stanchions rigidly carried by said horizontal base-piece and its four-footed support, the top of each of said stanchions having a crosswise-extending V-shaped notch in it and being at a height suitable for sharpening a handsaw, a convenience-till secured between the two stanchions in a position below said notches, said till comprising front and back side-pieces and a bottom piece and also serving as a rigid brace for said stanchions, a pair of separate flat removable front and back handsaw clamping-pieces adapted to be tightly pounded down into said V-shaped notches with a handsaw between them, a means for removably carrying said pair of handsaw clamping-pieces on the stand when they are not extending across between said stanchions in their operative positions in said notches, a flat vertically adjustable upstanding centrally disposed piece having a rounded top end and having one or more vertical-adjustment front-and-back-extending holes therein, a guiding-means for guiding the centrally disposed piece in its vertical adjustment, a bolt extending forwardly from the front side-piece of said till in a position adapted to extend through a lowermost vertical-adjustment hole or holes in said vertically adjustable piece and having a nut for holding said piece tightly against the front side-piece of said till at either a height suitable for sharpening a circular saw or a lower height which brings the top of the vertically adjustable piece out of the way when a handsaw is being sharpened, a separate circular-saw clamp-piece having a rounded top end and having one or more radial-adjustment front-and-back-extending holes therein, and a circular-saw clamping-bolt adapted to extend in any vertical adjustment through an uppermost vertical-adjustment hole or holes in said centrally disposed piece, through the central hole of a circular saw of any one of assorted sizes, and in any radial adjustment through a radial-adjustment hole or holes in the circular-saw clamp-piece, according to the size of circular saw which is to be sharpened.

2. The invention as defined in claim 1, characterized by the flat horizontal base-piece having a vertical hole therein having a size and shape adapted to serve as said guiding-means, for guiding the lower end of the centrally disposed piece in its vertical adjustment.

3. A portable saw-filing stand as defined in claim 1, in combination with a separate wedge-piece for steadying the four-footed support on an uneven floor, and a means for removably carrying said wedge-piece on the stand when it is not in use.

4. The invention as defined in claim 1, characterized by the lateral separation between the stanchions, and also the lengths with the pair of handsaw clamping-pieces, being sufficient to permit the sharpening of the entire length of an ordinary handsaw at a single clamping.

5. The invention as defined in claim 1, characterized by the larger parts of the stand being made mostly of wood, and further characterized by each stanchion having a front-and-back-extending strengthening-means disposed immediately under the notch for preventing splitting.

6. The invention as defined in claim 1, characterized by the vertical-adjustment hole or holes in said upstanding centrally disposed piece being a plurality of discrete vertically spaced substantially round holes, the bolt on the till being adapted to extend through either one of two of said holes, and the circular-saw clamping-bolt being a removable bolt which is adapted to extend through any one of a plurality of said holes.

7. The invention as defined in claim 6, characterized by the radial-adjustment hole or holes of the circular-saw clamp-piece being a plurality of discrete spaced substantially round holes, and the removable circular-saw clamping-bolt being adapted to extend through any one of said radial-adjustment holes.

8. The invention as defined in claim 1, characterized by the radial-adjustment hole or holes of the circular-saw clamp-piece being a plurality of discrete spaced substantially round holes, and the circular-saw clamping-bolt being a removable bolt which is adapted to extend through any one of said radial-adjustment holes.

9. The invention as defined in claim 8, characterized by said separate circular-saw clamp-piece having rounded top and bottom ends so that either end can be turned to the top, and having a central hole and a plurality of aligned vertically spaced holes on one side of its central hole.

10. The invention as defined in claim 8, characterized by said separate circular-saw clamp-piece being a disk having a plurality of holes at different radii with respect to the center of the disk.

BERT FRAZIER.

No references cited.